May 10, 1966     L. H. WALBRIDGE     3,250,960
CIRCUIT USING ALTERNATING VOLTAGE TRANSDUCERS
Filed April 30, 1963
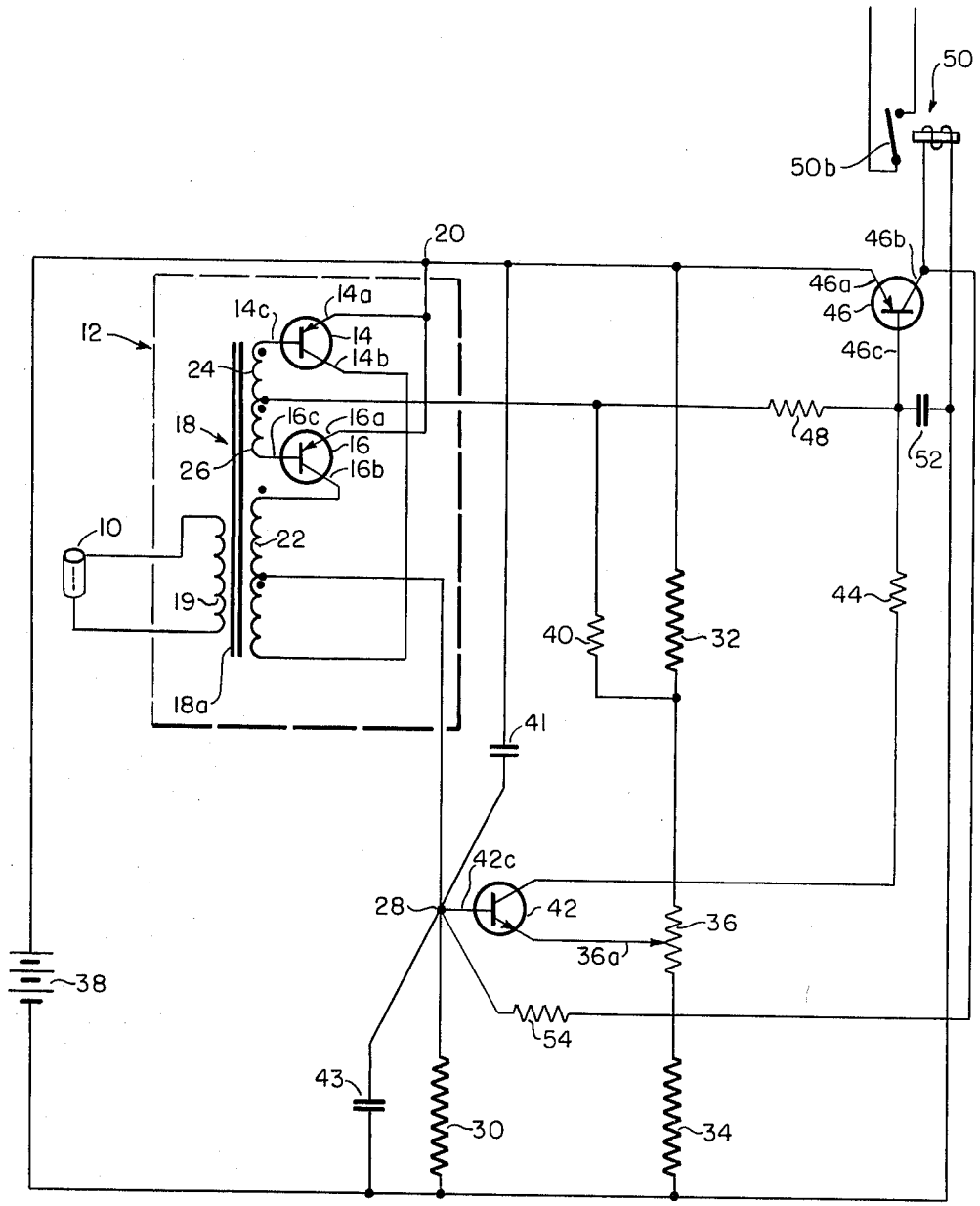
INVENTOR.
LYMAN H. WALBRIDGE
BY Kenway Jenney + Hildreth
ATTORNEYS ved circuit of my invention.
United States Patent Office 3,250,960
Patented May 10, 1966

3,250,960
CIRCUIT USING ALTERNATING VOLTAGE TRANSDUCERS
Lyman H. Walbridge, Ashland, Mass., assignor to Fenwal Incorporated, Ashland, Mass.
Filed Apr. 30, 1963, Ser. No. 276,761
6 Claims. (Cl. 317—153)

My invention relates to an improved electrical circuit utilizing transducers which can be excited only by an alternating voltage in applications where only direct voltage sources are available. More specifically it relates to an improved circuit for utilizing alternating voltage transducers whose impedance varies in response to a physical condition which is to be measured in environments where only a direct voltage source is provided.

There are certain types of transducers for measuring physical quantities which, because of their inherent structure, can be excited only by an alternating voltage. The tubular salt-filled detectors used for line overheat detection in aircraft are one example of transducers of this type. Other examples of such transducers include those depending upon changes in capacity or inductance in response to changes in the physical quantity to be measured. In the temperature transducers mentioned above the resistance of the salt compound drops very sharply at some predetermined temperature depending upon the particular composition of the salt. However, excitation of these devices with direct voltage may render them inoperable.

In large aircraft, where salt detectors of this type are used for line overheat detection, 400 cycle alternating voltage is available from the aircraft alternator and the detector may be directly excited from this source. However, in smaller aircraft, and in large aircraft when on the ground, and in certain other situations where salt detectors are desirable, often only direct voltage is available. Energization of the salt detector with this direct voltage would cause it to polarize and deteriorate. Of course, a converter might be used to change the direct voltage to an alternating voltage and this alternating voltage could be used to energize the transducer to thereby measure its impedance with a circuit capable of making alternating current measurements. However, a converter to generate an alternating voltage for a complete system using a single transducer which system also includes a bridge, amplifier, etc. is often undesirable from an economic standpoint, and for this reason some transducers requiring alternating voltage excitation have not found wide application in situations where only a direct voltage source is available.

I have developed an improved circuit which permits the measurement of the impedance of a transducer when excited with an alternating signal when only a direct voltage source is available, or when electrical isolation of the transducer from the direct voltage source is desired. While I will describe my invention with respect to a salt element such as is used in a line overheat alarm system, it is to be understood that it is applicable to other types of transducers whose alternating signal impedance is to be measured or which must be isolated from the bridge circuit. Salt elements of the type to which reference is made are described for example in my U.S. Patent No. 2,413,215, issued on December 24, 1946.

In my improved circuit, the transducer is connected in an electrically isolated manner to the output terminals of a free running multivibrator, preferably of the so-called "Uchrin" type; the entire multivibrator is connected as one element in a "Wheatstone bridge." The other bridge impedances are adjusted so that the bridge is balanced when the physical quantity is at a known value. If, thereafter the physical quantity to which the transducer responds changes, the transducer impedance will change and this will be reflected as a change in the effective impedance of one element in the bridge, i.e., the multivibrator, thus unbalancing it. The magnitude and direction of unbalance may then be measured to determine the magnitude and direction of the change in the physical quantity.

As can be seen from the foregoing, a principal object of my invention is to provide an improved electrical circuit for measuring the alternating current impedance of a device when only a source of direct voltage is available. A further object of my invention is to provide a circuit capable of isolating the line element of a bridge circuit from the power source. Another object of my invention is to provide a circuit of the type described which is particularly adaptable to measuring the alternating current resistance of salt elements used in aircraft fire detection systems. Yet another object of my invention is to provide a circuit of the type described which is simple and economical of construction. Other and further objects of my invention will in part be obvious and will in part appear hereinafter.

For a fuller understanding of the nature and objects of my invention, reference should be had to the following detailed description taken in connection with the accompanying drawing in which the single figure is a schematic circuit diagram of a fire detecton system using the improved circuit of my invention.

As shown in the drawing, the changes in impedance of a salt element 10 are to be measured. The element 10 typically is a hermetically sealed metallic tube with a center wire. Insulation impergnated with a selected salt compound is placed between the center wire and the tube. The tube is one electrode of the element and the center wire the other. At low temperatures, e.g. less than 500° F., the alternating signal impedance is relatively high, its value depending upon the length of the tube. In general it is above 1,000 ohms even for long tube lengths. However, if the salt compound is subjected to a critical temperature above this value, the exact critical temperature depending on the compound, the resistance will drop sharply to a few ohms, indicating an overheat. It is this sharp drop in resistance which it is desired to detect.

The multivibrator which supplies the alternating signal to the salt element 10 is generally indicated at 12. The multivibrator illustrated is of the Uchrin type which is described in the Proceeding of the I.R.E., vol. 43, No. 1 for January 1955 at page 99, and also in the July 1955 edition of the Transactions of the A.I.E.E., pages 322–326 in an article by G. H. Royer. A property of this type of multivibrator which is important in my circuit is that if the input current is limited for example, by a series resistor and the alternating voltage across the output winding is also limited as by clipping or loading a value within the switching capabilities of the transistor circuit; the limited alternating voltage across the output winding will cause a substantially proportional direct voltage to appear across the multivibrator power input terminal. For example, if because of a change in loading, the output alternating voltage drops by 50%, the direct voltage across the input terminal will change by substantially the same proportion.

As shown, the multivibrator generally shown at 12 includes a pair of transistors 14 and 16 and a transformer generally indicated at 18. The salt element 10 is connected directly to the output winding 19 of the transformer 18. The emitters 14a and 16a of the two transistors are connected to one power input terminal 20 of the multivibrator 12. The collectors 14b and 16b of the two transistors are connected to opposite ends of the primary winding 22 of the transformer 18. The bases 14c and 16c of the multivibrator transistors are connected as shown through the feedback windings 24 and 26 of the transformer 18 to a source of bias potential to be hereinafter described. The center tap of winding 22 is connected to the other power input terminal 28 of the multivibrator.

The "Wheatstone bridge," of which the multivibrator 12 is one element, includes the resistor 30, connected as shown in series with the multivibrator and the two series resistors 32 and 34. A balancing potentiometer 36 interconnects the resistors 32 and 34 as shown. The two legs of the bridge, that are formed by the multivibrator 12 and resistor 30 and that formed by the resistors 32 and 34 and potentiometer 36 are connected in parallel across a source of direct voltage, here shown for illustrative purposes as a battery 38. A bias current is supplied to the bases of transistors 14 and 16 through resistor 40 connected to one end of resistor 32. A capacitor 41 is connected across the multivibrator 12 to prevent sudden variations in the voltage across its terminal, due to switching transients, from affecting the bridge balance. A similar capacitor 43 is connected in parallel with resistor 30 to insure the symmetry of the bridge.

As has been explained, the multivibrator 12 connected between terminals 20 and 28 together with its associated salt element load forms one element of a bridge. Under conditions of normal operation, the ratio of the reflected resistance of the multivibrator to resistor 30 is greater than the ratio of resistor 32 and that portion of the potentiometer resistance element above the movable contact 36a to the sum of resistor 34 and the portion of the potentiometer resistance element below the movable contact, this results in transistor 42 being in a nonconducting state as will be described below. If an overheat occurs in the vicinity of the salt element, its temperature rises, its resistance drops and it draws substantially more power from the multivibrator. This is reflected as a drop in impedance between the power in terminals 20 and 28 of the multivibrator which unbalances the bridge. This bridge unbalance is sensed by a sensing circuit, one example of which is shown in the drawing and which will be hereinafter described and if the unbalance is sufficiently great an alarm circuit is actuated.

The sensing circuit includes the transistor 42, whose base 42c is connected to the multivibrator and resistor 30, terminal 28, and whose emitter 42a is connected to the movable element 36a of the balance potentiometer 36. The collector 42b of transistor 42 is connected through resistor 44 to the base 46c of the output transistor 46. A biasing resistor 48 is connected between the ends of the base windings 24 and 26 of the multivibrator transformer 18 and the base of transistor 46. As shown, the emitter 46a of transistor 46 is connected to the positive terminal of the battery 38, while the collector is connected through the coil of the relay generally indicated at 50 to the negative terminal of the battery 38. A capacitor 52, whose function will be described below, is connected between the base 46c of transistor 46 and ground. Finally, a feedback resistor 54 is connected between the collector of transistor 46 and terminal 28.

Before describing the operation of the entire circuit, the operation of multivibrator 12 will be briefly described. A more complete description of its operation is given in the publications cited above. The core 18a of the transformer 18 is preferably of magnetic material exhibiting a substantially rectangular hysteresis loop. The two transistors 14 and 16 operate effectively as switches. As can be seen in the drawing both transistor emitters are connected to a source of positive potential and the bases of both transistors are connected through their respective windings and resistor 40 to a potential below that of the emitters. In the absence of a voltage induced in the windings 24 or 26 both transistors 14 and 16 are biased for conduction.

When power is first applied to the multivibrator circuit, one or the other of the two transistors will begin to conduct slightly ahead of the other because of slight non-symmetry in the two circuits. Assume for purposes of explanation that transistor 16 begins to conduct first. As soon as conduction begins, the emitter-collector impedance of the transistor drops, and substantially the full voltage appearing between terminals 20 and 28 is applied to the upper portion of the winding 22. The current in this winding rises, inducing voltages in the other transformer windings, with the senses indicated by the dots. The polarity of the voltage induced in winding 24 serves to insure that transistor 14 remains cut-off, while that induced in winding 26 insures transistor 16 will continue to conduct. This condition obtains until the core 18a of the transformer saturates at which time the voltages in windings 26 and 24 disappear and transistor 14 can now conduct. As soon as conduction begins in transistor 14, the voltage between terminals 20 and 28 is connected across the lower portion of winding 22; the current through the lower part of the winding 22 causes the flux in the core to reverse and the multivibrator switches. It will be noted that in switching the polarity of the voltage induced in winding 26 is such as to cut off transistor 16. The multivibrator thus free runs, one transistor and then the other conducting to generate a square wave output signal. The multivibrator output signal is supplied, via winding 19 to the salt element 10.

As previously noted if the resistance of the salt element drops because of high temperature, it will require additional power and this in turn will be reflected as an effective impedance drop between the terminals 20 and 28. If the bridge was in balance prior to this time, the transistor 42 would be nonconducting, since the movable element 36a of the potentiometer 36 is positioned so that when the bridge is balanced transistor 42 is nonconducting. With the drop in effective impedance of the multivibrator, the base voltage of transistor 42 rises, causing transistor 42 to conduct. Current is then drawn by the transistor 44, dropping the normally positive base bias on transistor 46 and causing it to change from a normally non-conducting to a conducting state and in turn causing relay 50 to operate, thereby closing the normally open alarm contacts shown at 50b.

Bias for the transistor 46 is supplied through resistor 48 which is connected to the junction of the windings 24 and 26. Since, one or the other of the transistors of the multivibrator is always conducting, and since the base of this transistor is then at the potential of the positive terminal of battery 38 (except for the negligible emitter-base diode drop) the other end of the winding associated with the conducting transistor must be at a potential above that of the battery positive terminal. This condition obtains at all times, except during switching, and the switching transients are smoothed by condenser 52. Thus the base 46c is at a potential above that of the positive terminal of battery 38 to which the emitter of transistor 46 is connected and the transistor is normally non-conducting. However, when the bridge is unbalanced and transistor 42 conducts, the potential at the base 46c drops below the battery potential and transistor 46 conducts.

The collector potential of transistor 46 is fed back through resistor 54 to the base of transistor 42. This "boot-straps" transistor 42 and tends to hold it conducting even though there may be some variation in the multivibrator impedance. Larger changes in impedance will however cause transistor 42 to again become nonconducting and the "drop-out" may be adjusted by adjusting the value of resistor 54.

Thus, I have provided an improved circuit responsive to the alternating signal impedance changes of a transducer in an environment where only a direct voltage power source is available. The circuit of my invention generates only so much alternating voltage as is actually required for use by the transducer while all power consuming and signalling measurements are readily made on a direct voltage basis. The circuit of my invention is simple and economical of construction providing a relatively low cost device for use in environments where no alternating voltage supply is available or where isolation of a particular element of the bridge is required.

While I have described my invention with respect to a particular transducer, a salt element requiring alternating current excitation, a particular converter, a Uchrin multivibrator, and a particular sensing circuit, it is to be understood that my invention has application for other types of transducers, and that different converters and sensing circuits might be used in practice.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Direct current apparatus for sensing a physical condition with a variable impedance transducer excited by an alternating voltage comprising, in combination, a source of direct voltage, a voltage conversion means, said voltage conversion means having a pair of power input terminals and a pair of output terminals and being adapted to convert a direct voltage applied to its power input terminals to an alternating voltage at its power output terminals, means connecting said power input terminals to said voltage source, said connecting means including at least one impedance element in series between said converter and said source, a variable impedance transducer adapted for alternating voltage excitation, means connecting said transducer to the output terminals of said voltage conversion means, changes in impedance of said transducer being reflected as variations in the input impedance of said conversion means, and direct current measuring means responsive to current variations in the series circuit including said conversion means and said impedance elements resulting from variations in said transducer impedance.

2. Direct current apparatus for sensing a physical condition with a variable impedance transducer excited by an alternating voltage comprising, in combination, a source of direct voltage, an impedance bridge connected in parallel with said direct voltage source, said bridge including two legs, the first of said legs including a first and a second impedance and means connecting said impedances in series, the second of said legs including a third impedance and voltage conversion means, said voltage conversion means having a pair of power input and a pair of output terminals and being adapted to convert a direct voltage applied to its power input terminals to an alternating voltage at its output terminals, one input terminal of said voltage conversion means being connected to one terminal of said third impedance, means connecting the other input terminal of said conversion means to said voltage source, means connecting the other terminal of said third impedance to said voltage source, a variable impedance transducer adapted for alternating voltage excitation, means connecting said transducer to the output terminals of said voltage conversion means, and measuring means connected between the junction of said first and second impedances and the junction of said third impedance and said voltage converter, changes in impedance of said transducer being reflected as variations in the impedance of said converter, said impedance variations causing unbalance of said bridge.

3. The combination defined in claim 2 in which said converter is a Uchrin multivibrator.

4. The combination defined in claim 1 in which said transducer is a salt element used for fire detection.

5. Overheat detection apparatus comprising, in combination:
  (a) a salt element whose resistance drops sharply on being exposed to a temperature above a critical value;
  (b) a direct voltage to alternating voltage converter having a pair of power input terminals for connection to a source of direct voltage and a pair of output terminals;
  (c) means connecting said salt element to the output terminals of said converter;
  (d) a source of direct voltage;
  (e) a Wheatstone bridge connected across said voltage source, said bridge having three fixed resistive elements, the fourth element of said bridge being said voltage converter, the power input terminals of said converter being connected in said bridge circuit, said bridge being balanced when said element is at a temperature below its critical value;
  (f) means for operating an alarm device; and
  (g) means responsive to unbalance of said bridge for causing said operating device to function.

6. The combination defined in claim 5 in which said direct voltage to alternating voltage converter is a Uchrin multivibrator.

References Cited by the Examiner

UNITED STATES PATENTS

| | | | |
|---|---|---|---|
| 2,525,016 | 10/1950 | Borell | 317—153 X |
| 2,931,957 | 4/1960 | Paar | 317—153 |
| 3,004,194 | 10/1961 | Bohnert | 317—153 X |
| 3,172,049 | 3/1965 | Quittner et al. | 331—113.1 |
| 3,188,500 | 6/1965 | Zarleng | 331—112 X |

SAMUEL BERNSTEIN, *Primary Examiner.*

L. T. HIX, *Assistant Examiner.*